US012654734B2

(12) United States Patent
Wang

(10) Patent No.: US 12,654,734 B2
(45) Date of Patent: Jun. 16, 2026

(54) AUTONOMOUS DRIVING VEHICLE AS DATA CENTER INFRASTRUCTURE

(71) Applicant: Baidu USA LLC, Sunnyvale, CA (US)

(72) Inventor: Qiang Wang, Cupertino, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 682 days.

(21) Appl. No.: 17/940,861

(22) Filed: Sep. 8, 2022

(65) Prior Publication Data

US 2024/0083452 A1      Mar. 14, 2024

(51) Int. Cl.
*B60W 60/00* (2020.01)
*B60W 50/10* (2012.01)
*G07C 5/00* (2006.01)

(52) U.S. Cl.
CPC .......... *B60W 60/001* (2020.02); *B60W 50/10* (2013.01); *G07C 5/008* (2013.01); *B60W 2540/215* (2020.02)

(58) Field of Classification Search
CPC .............. B60W 60/001; B60W 50/10; B60W 2540/215; B60W 60/00; G07C 5/008; G05D 1/00
See application file for complete search history.

(56) References Cited

U.S. PATENT DOCUMENTS 9,365,213 B2 * 6/2016 Stenneth ............. B60W 30/182
10,482,226 B1 * 11/2019 Konrardy ................ G06F 30/20

| | | | | |
|---|---|---|---|---|
| 10,635,104 | B2 * | 4/2020 | Fox ...................... | G05D 1/0061 |
| 10,953,888 | B2 * | 3/2021 | Wilson ................. | A61B 5/6802 |
| 11,427,215 | B2 * | 8/2022 | Wang ..................... | G06N 3/045 |
| 12,002,367 | B2 * | 6/2024 | Herbach ......... | B60W 60/00253 |
| 2018/0183855 | A1 * | 6/2018 | Sabella ................... | H04L 67/04 |
| 2019/0222986 | A1 * | 7/2019 | Aitken ................. | H04W 12/06 |
| 2020/0027354 | A1 * | 1/2020 | Goldman ....... | G06Q 10/063118 |
| 2020/0116515 | A1 * | 4/2020 | Chadha ............. | G01C 21/3691 |
| 2021/0174678 | A1 * | 6/2021 | Wright ................. | G06F 9/5072 |
| 2021/0380126 | A1 * | 12/2021 | Liu ........................... | G06N 5/02 |
| 2022/0032933 | A1 * | 2/2022 | Wang ................... | B60W 50/06 |
| 2023/0032183 | A1 * | 2/2023 | Kang ................. | H04L 67/1001 |

\* cited by examiner

*Primary Examiner* — Peter D Nolan
*Assistant Examiner* — Demetra R Smith-Stewart
(74) *Attorney, Agent, or Firm* — WOMBLE BOND DICKINSON (US) LLP

(57) ABSTRACT

Embodiments are disclosed of a data center including a plurality of computers. A communication interface is communicatively coupled to the plurality of computers and adapted to communicate, wirelessly or by wire, between the plurality of computers, a user device, and at least one autonomous driving vehicle (ADV) computer. Instructions are stored in the plurality of computers that cause one or more of the plurality of computers to receive a user computing request from the user device. The computers determine whether there is an available ADV computer to execute the user computing request. If there is an available ADV computer to execute the user computing request, the computers reconfigure the available ADV computer from autonomous driving mode to computing mode, and transmit the user computing request for execution by the ADV computer. If no ADV computer is available to execute the computing request, then the request is executed by one or more of the plurality of computers.

16 Claims, 7 Drawing Sheets

200

300

400

Sensor System
615

Control System
611

Wireless Communication System
612

User Interface System
613

Autonomous Driving System
610

Autonomous Driving Vehicle
601

AUTONOMOUS DRIVING VEHICLE AS DATA CENTER INFRASTRUCTURE

TECHNICAL FIELD

The disclosed embodiments relate generally to data centers and more specifically, but not exclusively, to using computing hardware in an autonomous driving vehicle (ADV) as an extension of data center or data center infrastructure.

BACKGROUND

Many widely-used cloud-based applications run in, and need huge support from, a data center. The data centers in which the applications run are centralized to save cost for things such as facility maintenance, but the end users are widely distributed all over the world, often far from the data center. This need to service widely distributed users from a centrally located data center puts a burden on the communication networks that connect users to the data center, substantially increasing their bandwidth requirements and their cost.

BRIEF DESCRIPTION OF THE DRAWINGS

Non-limiting and non-exhaustive embodiments of the invention are described below with reference to the following figures, wherein like reference numerals refer to like parts throughout the various views unless otherwise specified.

DETAILED DESCRIPTION

Figure 1:
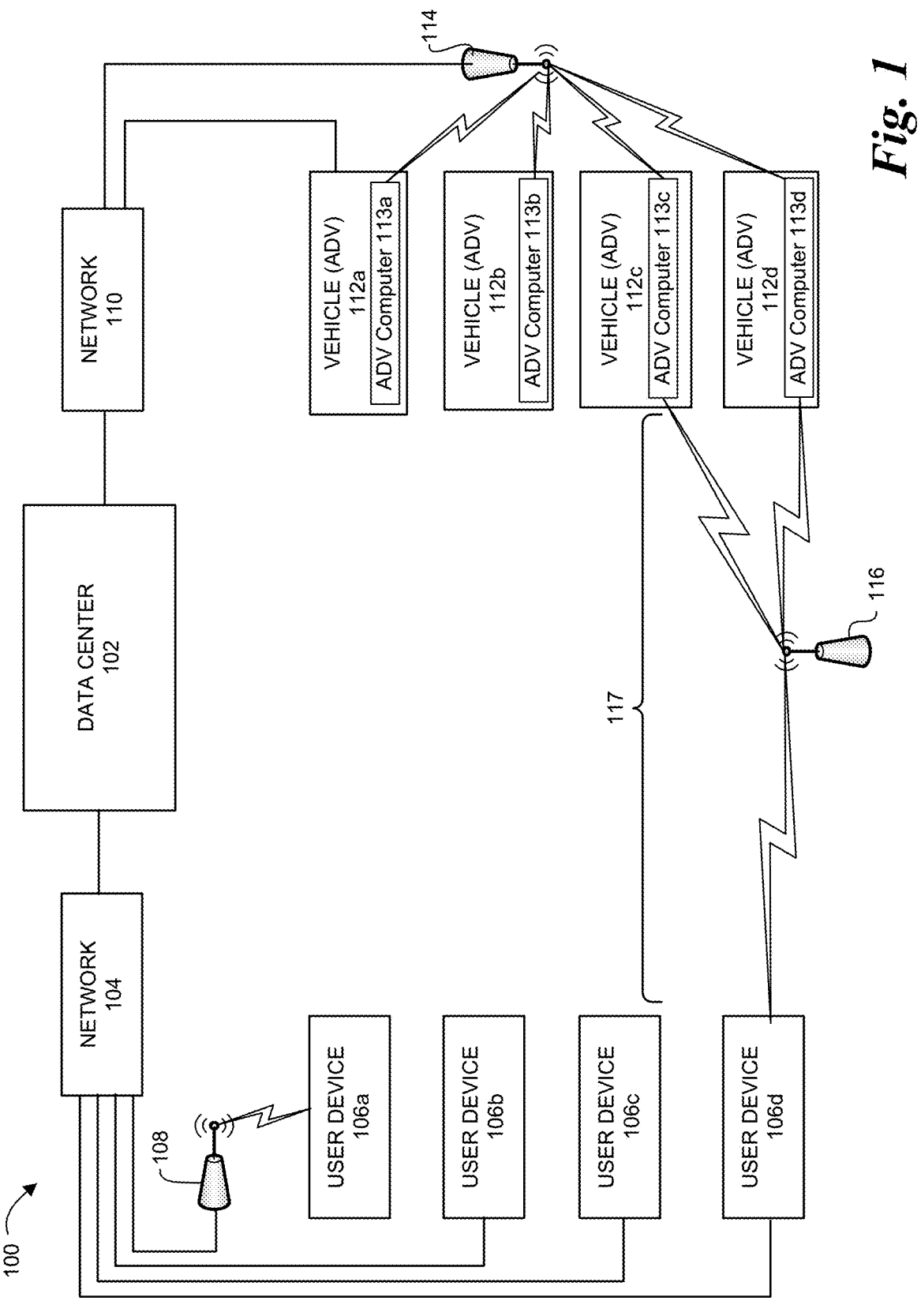
FIG. 1 is a block diagram of an embodiment of a system for using computers in autonomous driving vehicles (ADVs) as an extension of the data center infrastructure.

Embodiments are described of an apparatus and method for using computing hardware in an autonomous driving vehicle (ADV) as part of, or an extension of, data center infrastructure. Specific details are described to provide an understanding of the embodiments, but one skilled in the relevant art will recognize that the invention can be practiced without one or more of the described details or with other methods, components, materials, etc. In some instances, well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment, so that appearances of "in one embodiment" or "in an embodiment" do not necessarily all refer to the same embodiment. Furthermore, the described features, structures, or characteristics can be combined in any suitable manner in one or more embodiments. As used in this application, directional terms such as "front," "rear," "top," "bottom," "side," "lateral," "longitudinal," etc., refer to the orientations of embodiments as they are presented in the drawings, but any directional term should not be interpreted to imply or require a particular orientation of the described embodiments when in actual use.

The invention intends to utilize the massive, advanced computing resources, which is distributed align with population naturally, as data center computing resource to service local customs while autonomous vehicle is not running.

Embodiments are described below of a system and process to use autonomous driving vehicle (ADV) computing resources to provide cloud computing as a service or as an extension of existing data centers. The most powerful high-performance computers found in data centers provide a computing power of approximately 1685.65 Petaflops per second (PFlop/s), and current estimates for the computing power required for level four (L4) or level five (L5) autonomous driving vehicle (ADV) computers are approximately 1 PFlop/s and likely to go higher as ADV systems become more capable. Besides normal driving on road, most of time, the vehicle will be parked at packing lots. It is obverse that the valuable computing resource on L4/5 ADV can be used as a supercomputer when not controlling driving. As ADVs become more widely accepted and the total number of ADVs reaches into the millions, idle ADV computers can provide more computing power than high-performance computers used in the data centers of top cloud service providers.

Besides their computing power, ADV computers have several features that make them a good fit for use as an extension of data center infrastructure and allows ADVs to provide extra societal value:

The spatial distribution of ADVs naturally follows the distribution of human population—in other words, the ADVs are where the people are—so using ADVs could make it easier to provide computing services to local users or communities.

ADV computers have rich hardware resources (CPU, GPU, ASICS, etc.) that are a good fit to perform computing tasks like video/audio/text multimedia data processing, AI training/reference computing, computing intensive algorithms, etc.

ADV computing resources are designed to be highly reliable, which is very favorable for their use as an extension of a data center.

No extra facility is needed to host the computing resources, as a result of which ADVs help reduce capital cost for data centers.

OTA (over-the-air) updating or programming is widely supported by ADV computers and can be used to switch the ADV computer's workload from autonomous driving mode to a computing mode that can perform generic computing tasks. When parked for charging or otherwise idle, the ADV can be connected to a network and converted to a micro data center by reconfiguring its software stack from an autonomous driving mode to a distributed computing mode using its OTA capacity, creating an ADV-based data center that provides service to a community.

In one aspect the data center includes a plurality of computers. A communication interface is communicatively coupled to the plurality of computers and is adapted to communicate, wirelessly or by wire, between at least one of the plurality of computers, a user device, and at least one autonomous driving vehicle (ADV) computer. Instructions are stored in the plurality of computers that, when executed, cause one or more of the plurality of computers, via the communication interface, to receive a user computing request from the user device and determine whether there is an available ADV computer to execute the user computing request. If there is an available ADV computer to execute the user computing request, the instructions reconfigure the available ADV computer from autonomous driving mode to computing mode and transmit the user computing request for execution by the ADV computer operating in computing mode. If there is no available ADV computer to execute the computing request, then the data center executes the user computing request using one or more of the plurality of computers.

In one embodiment the instructions to transfer the user computing request to the reconfigured ADV computer includes instructions to transfer the requested operations, data, and a network address of the user device to the ADV computer operating in computing mode and transfer any data stored in the data center and necessary for the requested operations to the ADV computer operating in computing mode. In another embodiment the instructions stored in the plurality of computers include instructions for the data center to periodically receive a location and an availability status of the ADV computer. In another embodiment the instructions to determine whether there is an available ADV computer to execute the user computing request include instructions to determine the location of the user device, determine whether there is an ADV computer within a specified distance of the user device or with which a communication path of sufficient bandwidth can be established with the user device. In still other embodiments the instructions stored in the plurality of computers include instructions to reconfigure the available ADV computer from computing mode to autonomous driving mode. In yet other embodiments an ADV computer is available if the ADV in which the ADV computer is located is idle. The ADV is idle when the ADV computer need not interact with the vehicle control system. In another embodiment reconfiguring the ADV computer comprises reconfiguring the ADV computer using over-the-air (OTA) programming.

In another aspect, an autonomous driving vehicle (ADV) includes an ADV computer communicatively coupled to a vehicle control system and a vehicle sensing system. The ADV computer includes a communication interface that is adapted to communicate wirelessly with a data center and a user device external the ADV. The ADV computer is adapted to run in an autonomous driving mode and in a computing mode. Instructions are stored on the ADV computer that, when executed, cause the ADV computer to receive, via the communication interface, instructions to reconfigure the ADV computer from the autonomous driving mode to the computing mode. The ADV computer also receives a user computing request from the data center, establishes a direct communication path with a user device from which the user computing request originated, executes the user computing request while in computing mode, transmits the results of executing the user computing request to the user device via the communication path, and signals to the user device that the user computing request was completed.

In one embodiment the instructions stored on the ADV computer further include instructions for the ADV computer to determine whether the ADV computer is available to be reconfigured from the autonomous driving mode to the computing mode. If the ADV computer is available to execute the user computing request, then, via the communication interface, it transmits the ADV's location to the data center, and signals to the data center that the ADV computer is available to be reconfigured from the autonomous driving mode to the computing mode. In another embodiment the instructions stored on the ADV computer further include instructions for the ADV computer, when in computing mode, to receive a signal from the ADV or from the data center that the ADV computer is no longer available for computing mode, and receive, via the communication interface, instructions to reconfigure the ADV computer from the computing mode to the autonomous driving mode.

In another embodiment the instructions stored on the ADV computer further include instructions for the ADV computer that, when in computing mode, allow the ADV computer to exchange data with the user device before, during, and after execution of the user data request. In another embodiment the user computing request includes a network address of the user device. In yet another embodiment the instructions stored in the ADV computer include instructions to regularly report to the data center a location and an availability status of the ADV computer. In still other embodiments, the ADV computer is available if the ADV in which the ADV computer is located is idle. The ADV is idle when the ADV computer need not interact with the vehicle control system.

FIG. 1 illustrates an embodiment of a data center system 100 that uses ADV computers—i.e., computers in autonomous driving vehicles (ADVs)—as part of, or an extension of, the data center infrastructure. System 100 includes a data center 102 that can be communicatively coupled to a plurality of user devices 106 and a plurality of ADVs 112 so that data center 102 can receive user computing requests from user devices 106 and, if there is a suitable ADV computer available, transfer the computing request to the ADV computer for execution.

Data center 102 includes multiple computers (not shown separately), some or all of which are communicatively coupled, via communication interfaces, to one or more networks. In the illustrated embodiment data center 102 is communicatively coupled to two networks 104 and 110, but in other embodiments the data center can be communicatively coupled to a single network or to more than two networks. Embodiments of networks 104 and 110 can include wide-area networks (WAN), local-area networks (LAN), the internet, etc., and networks 104 and 110 can be, but need not be, the same type of network. In other embodiments user devices 106 and ADV computers 113 can communicate with data center 102 through a single network.

A plurality of user devices 106 are communicatively coupled to data center 102; the illustrated embodiment has four user devices 106a-106d, but other embodiments can include a different number of user devices 106 than shown. In the illustrated embodiment user device 106a is wirelessly coupled to network 104 through wireless access point 108, while user devices 106b-106d are coupled by wire to network 104. In other embodiments the type of connection between each user device 106 and network 104 can be different than shown; in any given embodiment, any user device 106 can be coupled wirelessly, by wire, or both, to network 104. When a user device 106 is coupled wirelessly via a wireless network access point 108, the network access point can be any kind of wireless network access point, such as a Wi-Fi router or a cell phone antenna.

A plurality of autonomous driving vehicles (ADVs) 112—or, more specifically, ADV computers 113 within vehicles 112—are communicatively coupled to data center 102; the illustrated embodiment has four ADVs 112a-112d, but other embodiments can include a different number of ADVs than shown. Because ADVs are mobile, in most embodiments they are communicatively coupled to network 110 wirelessly, through a wireless network access point 114. But on some occasions, such as when an electric ADV is being charged and is therefore stationary, the ADV computer can, instead or in addition, be communicatively coupled by wire to network 110; in the drawing this is illustrated only for ADV 112a, but can also apply to any other ADV 112. When an ADV 112 is coupled wirelessly via a wireless network access point 114, network access point 114 can be any kind of wireless network access point, such as a Wi-Fi router or a cell phone antenna.

A direct network communication path 117 can also be established directly between a user device 106 and an ADV 112. For purposes of this application, a direct communication path is a communication path separate from and independent of the communication path though data center 102, even if the direct communication path includes multiple links. In the illustrated embodiment, user device 106d has a wireless connection with network access point 116, and vehicles 112c and 112d similarly have a wireless connection with network access point 116, to create direct network communication path 117 through which user device 106d can communicate, via wireless access point 116, with one or both of ADV computers 113c and 113d. But user device 106d and ADV computers 113c and 113d need not establish a communication path through a single wireless access point as shown. In other embodiments, user devices 106 and ADV computers 113 can connect to different network access points and there can be multiple links, wired or wireless, between the network access points to which the user devices and ADVs connect directly. In the illustrated embodiment wireless access point 116 is shown separate from both user devices 106 and ADV computers 113, but in other embodiments wireless access point 116 can be the user device's or the ADV computer's own wireless adapter. For instance, in some embodiments where the user device and the ADV are near each other and/or within range of a short-range communication protocol such as Bluetooth, it can be possible to establish a direct communication path between user device and ADV computer without an intervening wireless access point.

In the illustrated embodiment direct network communication path 117 establishes a one-to-many communication between user device and ADV computers: one user 106d device can communicate with multiple ADV computers 113c and 113d. But other embodiments can have different communication correspondences between user device and ADV computer: there can be a one-to-one correspondence between user device and ADV computer (i.e., a single user device communicates with a single ADV computer); a many-to-one correspondence between user devices and ADV computer (i.e., multiple user devices communicate with a single ADV computer); or a many-to-many correspondence between user devices and ADV computers (i.e., multiple user devices communicate with multiple ADV computers).

Details of the operation of system 100 are described below in connection with FIGS. 4-5. But, briefly, in system 100 a user device 106 submits a user computing request to data center 102. In one embodiment the user computing request includes the location of user device 106 and ADVs 112 regularly report their locations to data center 102, so that the data center can determine if an ADV computer is available to execute the user computing request. An ADV is available for the user computing request if the ADV is idle (i.e., not currently needing its ADV computer to operate the vehicle) and a direct communication path with sufficient network bandwidth can be established or is likely to be established.

In one embodiment, establishing a direct communication path with sufficient bandwidth can mean that user device 106 and ADV 112 are physically near each other, so that they can communicate with each other though the same wireless access point of through a pair of wireless access points with a limited number of communication links between access points. In other embodiments establishing a direct communication path with sufficient bandwidth can mean that the user device is closer to the ADV than it is to the data center, so that less network resources should be needed to establish the direct communication path between user device 106 and ADV computer 113 than to establish a communication path between user device 106 and ADV computer 113 that runs through the data center. In other embodiments establishing a direct communication path with the required bandwidth can mean that high-speed communication, such as 5G cellular services or high-speed Wi-Fi, is available between user device and ADV.

If one or more available ADVs is identified, then the data center, for instance using over-the-air (OTA) programming, re-configures the ADV computer from autonomous driving mode, in which it can be used to operate the ADV, into a computing mode in which the ADV computer can operate to execute user computing requests instead of operating the vehicle. The ADV computer's computing mode can also be thought of as an extension mode, since when in computing mode it operates as an extension of data center 102. When the ADV computer has been reconfigured to computing mode, data center 102 directs the user computing request to the reconfigured ADV computer, now in computing mode, to establish a direct communication path 117 with the user device so that it can communicate with the user device and execute the user computing request.

Figure 2:
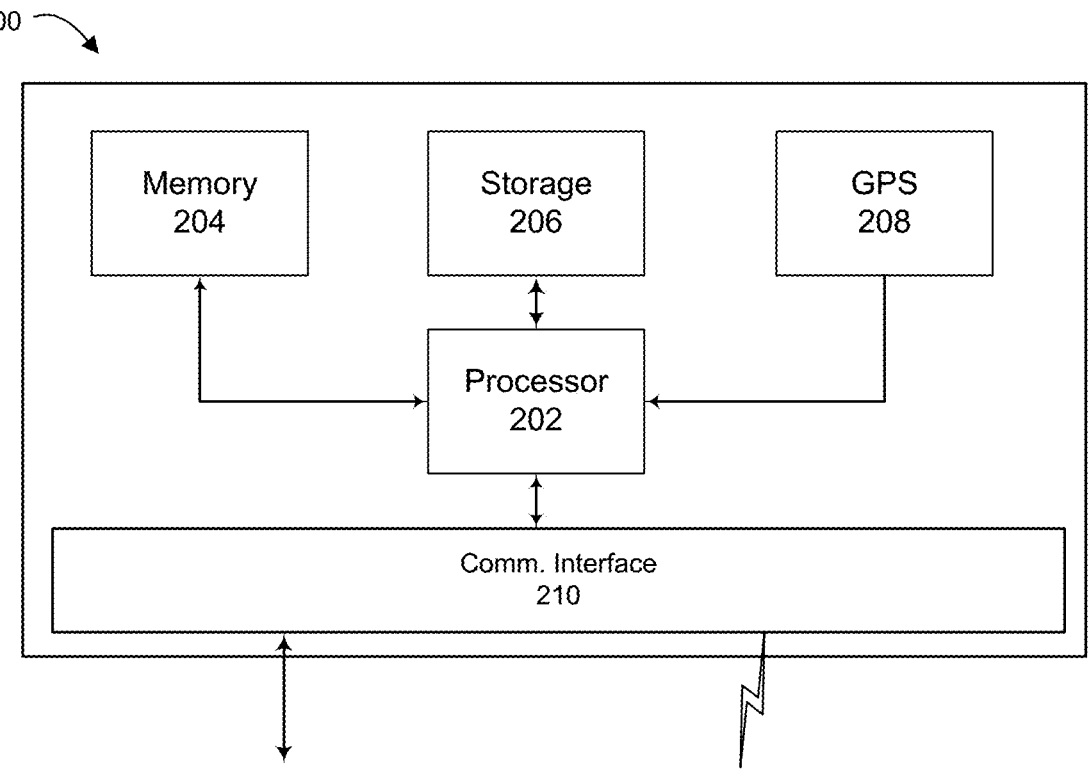
FIG. 2 is a block diagram of an embodiment of a user device that can be used in the system of FIG. 1.

FIG. 2 illustrates an embodiment of a user device 200 that can be used in embodiments of data center system 100. In different embodiments user device 200 can be a desktop computer, laptop computer, tablet, smartphone, or any other computing device capable of network connectivity. Other examples of users or user devices can include an office worker that must rely on cloud services to process daily workload; a smart phone for 3D gaming; a home user that uses cloud services for their personal workload, like entertainment, study, AR/VR consoles, etc.; home-use or community-use robots that need co-local server to provide computing service; and safe surveillance cameras that produce huge amount of real-time stream data which needs to be processed or analyzed to provide safety services locally.

User device 200 includes a processor 202 communicatively coupled to a memory 204, storage 206, and a device that can determine the location of user device 200. In the illustrated embodiment the position-determining device is a Global Positioning System (GPS) module 208, but in other embodiments other types of positioning-determining devices can be used. In still other embodiments, GPS 208 can be omitted or not used; if a precise location is not needed the location of user device 200 can be determined in other ways, such as by crowdsourcing or by the identity and location of its network connections such as a modem or wireless router. Processor 202 is communicatively coupled to communication interface 210 so that it can communicate, wirelessly or by wire, with other computing facilities or devices outside user device 200, such as a data center or an ADV computer.

Figure 3:
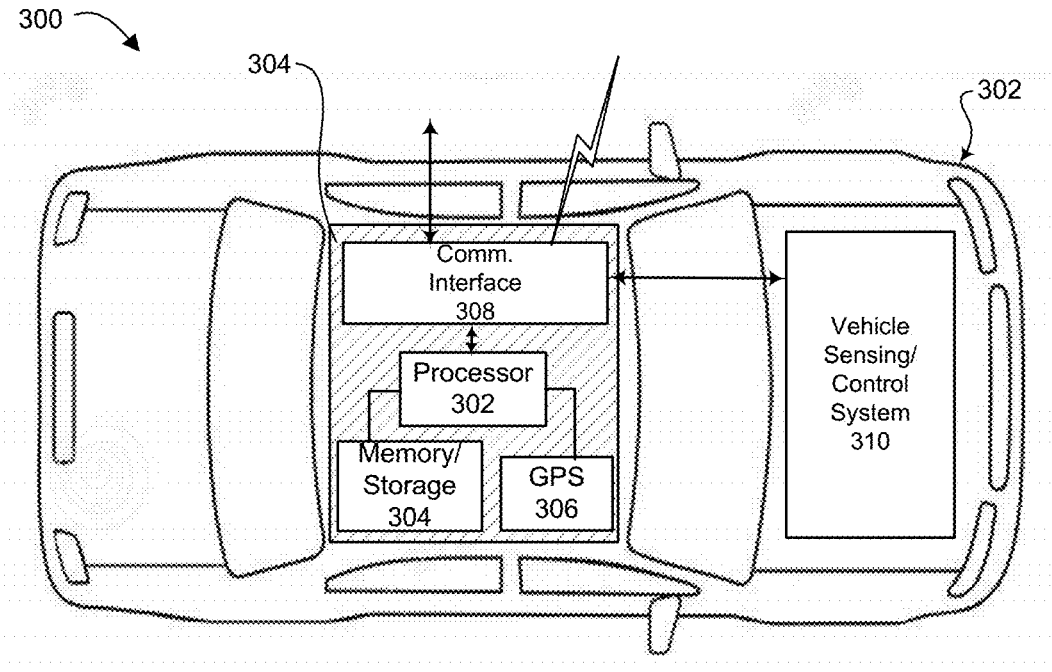
FIG. 3 is a block diagram of an embodiment of an ADV computer that can be used in the system of FIG. 1.

FIG. 3 illustrates an embodiment of an autonomous driving vehicle (ADV) 300 whose ADV computer 304 can be used in embodiments of data center system 100. ADV 300 includes a chassis 302 within which ADV computer 304 is housed. In the illustrated embodiment chassis 302 is a sedan, but in other embodiments chassis 302 can be the chassis of any other type of vehicle. In the illustrated embodiment ADV computer 304 is housed within the passenger compartment of chassis 302, but in other embodiments it can be housed in other compartments such as the trunk compartment or engine compartment. In one embodiment ADV computer 304 can be a computer powerful enough for level four (L4) or level five (L5) autonomous driving, but in other embodiments it can be a different computer, for instance one compatible with autonomous driving below L4.

ADV computer 304 includes a processor 302 communicatively coupled to memory/storage 304 and a device that can determine the location of ADV 300. In the illustrated embodiment the position-determining device is a Global Positioning System (GPS) module 306, but in other embodiments other types of positioning-determining devices can be used. In still other embodiments the location of ADV 300 can be determined in other ways, such as by crowdsourcing or by the identity and location of its network connections such as a wireless router. Processor 302 is communicatively coupled to communication interface 308 so that ADV computer 304 can communicate, wirelessly or by wire, with other computing facilities or devices outside ADV 300, such as a data center or an ADV computer.

In the illustrated embodiment ADV computer 304 is communicatively coupled, via communication interface 308, to a vehicle sensing and control system 310, so that ADV computer 304 can collect data from sensors in the sensing system and, based on data from those sensors, use the control system to drive ADV 300. The sensing portion of sensing and control system 310 can include sensors such as position sensors, accelerometers, ultrasound sensors, optical sensors, lidar sensors, etc. The control system portion of sensing and control system 310 can include speed controls (e.g., acceleration and braking) and direction controls (e.g., steering) for ADV 300. Although shown in the illustrated embodiment as a single combined unit 310, in other embodiments the sensing system and the control system can be different units (see, e.g., FIGS. 6-8).

Figure 4:
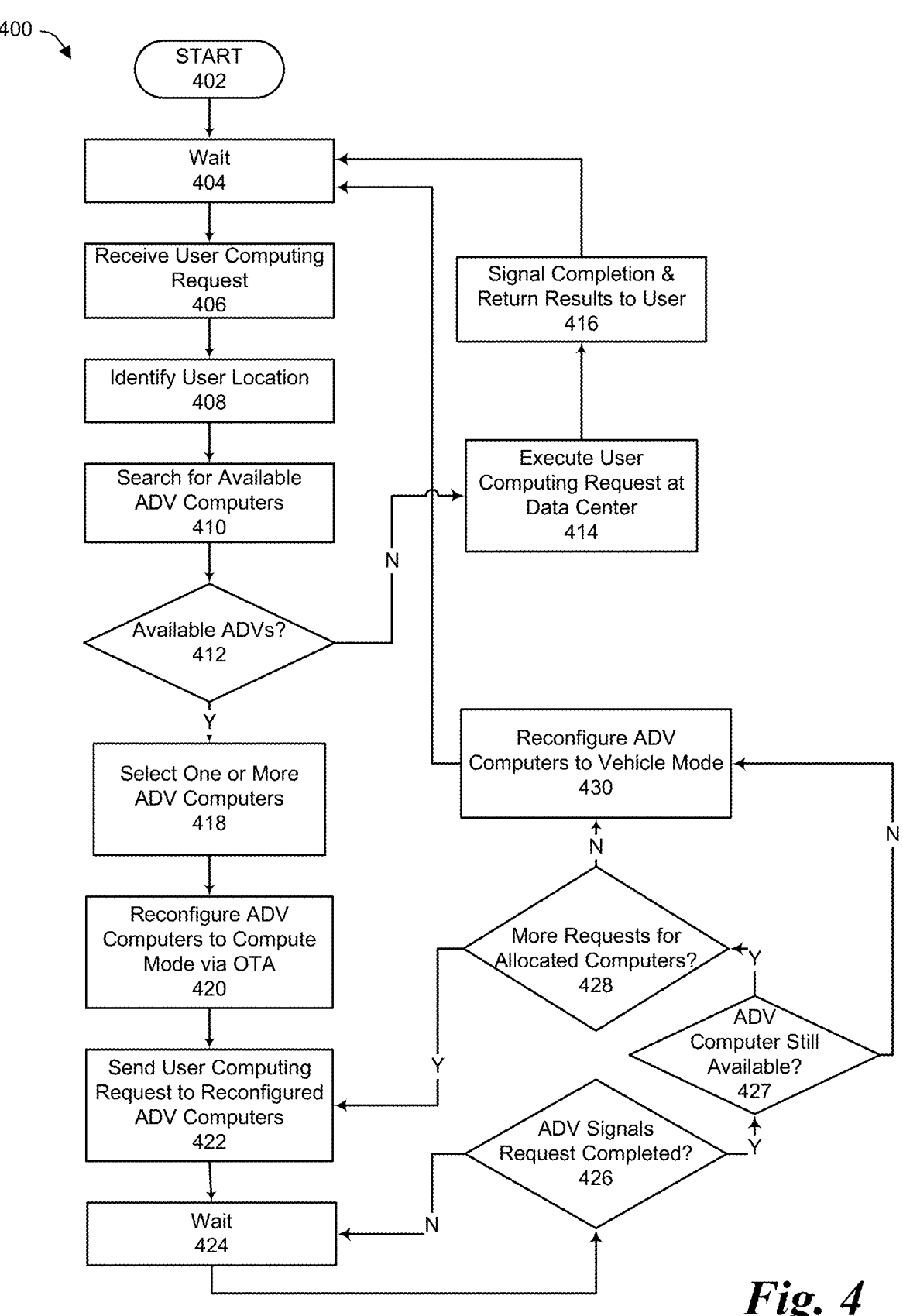
FIG. 4 is a flowchart of an embodiment of a process used by a data center to use an ADV computer as part of the data center infrastructure.

FIG. 4 illustrates an embodiment of a process 400 used by a data center 102 in a data center system such as data center system 100. The process begins at block 402. At block 404, the process waits to receive a user computing request from a user device, and at block 406 it receives the user computing request.

At block 406 the data center identifies the user device's location, for example using a network address of the user device, which in one embodiment is contained in the user computing request itself. Having determined the user device's location, at block 410 data center 102 searches for available ADV computers 113 that can handle the user computing request. As discussed above, an ADV computer is available for the user computing request if the ADV is idle (i.e., does not currently need its ADV computer to operate the vehicle) and a direct communication path with sufficient bandwidth can be established or is likely to be established between the user device and the ADV computer. In one embodiment availability can be based on the distance between the user device and the ADV computer; the data center, which will have previously collected location information for ADVs, can then simply find the ADVs closest to the user device. But in other embodiments an available ADV need not be the one closest to the user device.

At block 412 the process checks whether any available ADV computers 113 have been found. If at block 412 no available ADV computers have been found, the process moves to block 414, where the user computing request is performed by data center 102, and then moves to block 416, where the data center signals to the user device that the request has been completed and, if applicable, returns results of the request to the user. The process then returns to block 404 to wait for another user computing request. But if at block 412 the process identifies at least one available ADV computer 113, then it proceeds to block 418, where it selects one or more of the available ADV computers to which the user computing request will be allocated. The decision whether to allocate the user computing request to a single ADV computer 113 or multiple ADV computers can depend, for instance, on the size and complexity of the request.

At block 420 the data center uses over-the-air (OTA) programming to reconfigure each selected ADV computer 113 selected at block 418 from its autonomous driving mode (i.e., the mode in which it operates the ADV) and a computing mode or extension mode in which the ADV computer acts as an extension of the data center. Having reconfigured the selected ADV computers to computing mode at block 420, at block 422 the process sends the user request to the reconfigured ADV computers and proceeds to block 424, where it waits. In some embodiments data that is stored at the data center and is relevant to the user request can also be send to the ADV computers.

At block 426 the process checks whether the ADV computers have signaled to the data center that the user computing request has been completed. If at block 426 no indication of completion has been received, the process returns to block 424 and waits. But if at block 426 the process has received an indication (or multiple indications if the user computing request was allocated to multiple ADV computers), the process proceeds to block 427, where it checks whether the ADV computer is still available. The ADV computer can become unavailable, for instance, if a driver or passenger needs the ADV for transportation, so that it can no longer remain idle and therefore no longer remain available.

If at block 427 the ADV computer is still available, the process moves to block 428, where it checks whether there are more user computing requests to be executed by the already-reconfigured ADV computers. If at block 428 there are more user computing requests for the reconfigured ADV computers, the process moves to block 422, where the user computing requests are submitted to at least one of the reconfigured ADV computers. But if at block 427 the ADV computer is no longer available, or if at block 428 there are no more user computing requests, the process moves to block 430, where the data center again uses over-the-air (OTA) programming to reconfigure each selected ADV computer from its computing or extension mode to its autonomous driving mode. The process then moves back to block 404 to await further user computing requests.

Figure 5:
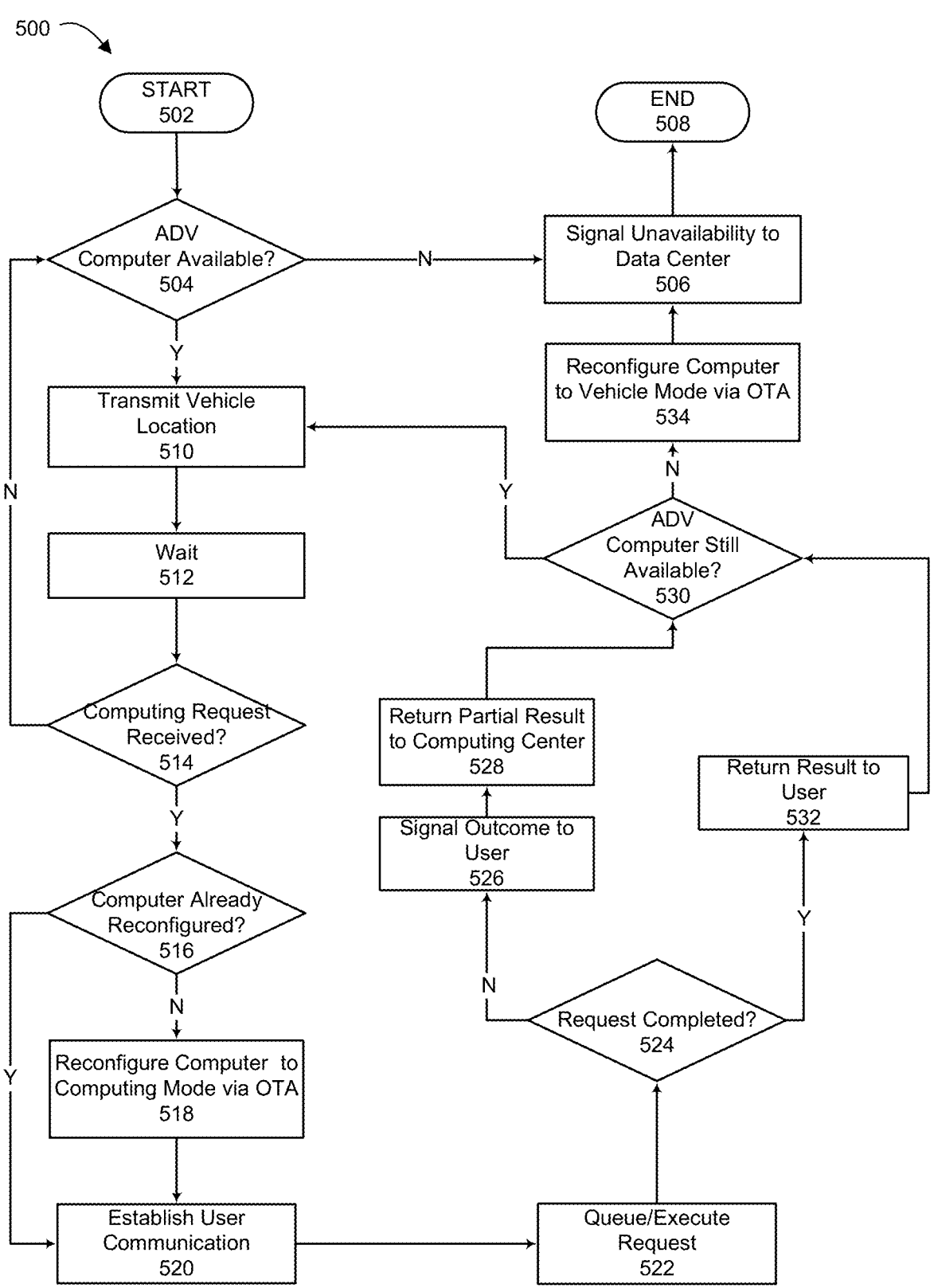
FIG. 5 is a flowchart of an embodiment of a process used by an ADV computer to function as part of the data center infrastructure.

FIG. 5 illustrates an embodiment of a process 500 used by an ADV computer 113 in a data center system such as data center system 100. The process begins at block 502. At block 504, the process checks whether ADV computer 113 is available. As discussed above, an ADV computer is available for the user computing request if the ADV is idle (i.e., it does not currently need its ADV computer to operate the vehicle) and a direct communication path with the required bandwidth can be established or is likely to be established between the user device and the ADV computer.

If at block 504 no ADV computers are available the process proceeds to block 506, where it signals to data center 102 that it is not available and then ends the process at block 508. But if at block 504 the ADV computer is available the process moves to block 510, where it transmits the vehicle location to the data center and then moves to block 512 to wait for instructions from the data center. At block 514 the process checks whether a user computing request has been received. If at block 514 no computing request has been received after a certain time, the process returns to block 504 to check whether the ADV computer remains available. But if at block 514 a user computing request is received the process moves to block 516, where it checks whether the ADV computer has already been reconfigured into computing mode.

If at block 516 the ADV computer has not already been reconfigured to computing mode, the process moves to block 518 where over the air (OTA) programming is used to reconfigure the ADV computer from autonomous driving mode to computing mode. The process then proceeds to block 520 to establish a direct communication path with the user device. But if at block 516 the ADV computer is already in computing mode, for instance because the ADV has remained idle since the last user computing request was received, the process bypasses block 518 and proceeds directly to block 520 to establish direct communication path 117 with the user device.

From block 520 the process moves to block 522, where it queues and/or executes the user computing request, and then moves to block 524, where it checks whether the user computing request has been completed. If at block 524 for the user computing request cannot or has not been completed—which can happen, for instance, if there was an error or if the ADV computer becomes unavailable during execution of the request—the process moves to block 526, where it signals the incomplete outcome to the user and then moves the block 528 where, if applicable, it returns partial results of the computing job to the user device. But if at block 524 the user computing request has been completed, the process moves to block 532 where it returns the result of the user computing request to the user via communication path 117 established at block 520.

From block 528 or block 532, depending on whether the request is complete at block 524, the process moves to block 530, where it checks whether ADV computer 113 is still available. The ADV computer may become unavailable, for instance, if the ADV is suddenly needed for transportation and the ADV computer must be reconfigured from computing mode back to autonomous driving mode. If at block 530 the ADV computer is still available the process returns the block 510 where it reports the ADV's location to the data center, in case its location has changed since the last location report. But if at block 530 the ADV computer is no longer available, the process moves to block 534 where OTA programming is used to reconfigure the ADV computer from computing mode to autonomous driving mode. The process then moves to block 506, where it signals the ADV computer's unavailability to the data center and then moves to block 508, where it ends.

Figure 6:
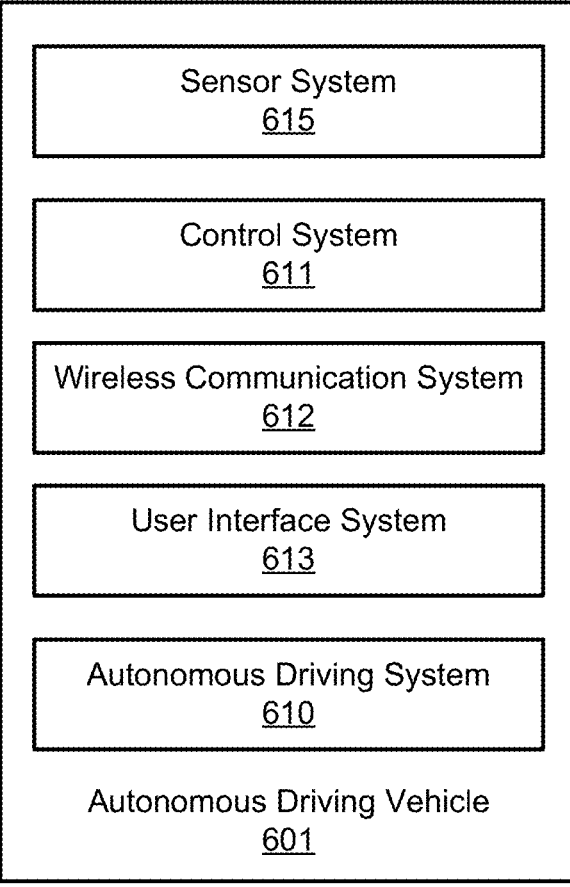
FIG. 6 is a block diagram illustrating an embodiment of an autonomous driving vehicle.

FIG. 6 is a block diagram illustrating an autonomous driving vehicle according to one embodiment of the disclosure. For example, autonomous driving vehicle 601 may represent any of the autonomous driving vehicles described above. Referring to FIG. 6, autonomous driving vehicle 601 may be communicatively coupled to one or more servers over a network, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server, a content server, a traffic information server, a map and point of interest (MPOI) server, or a location server, etc.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 601 can operate in a manual mode, a full autonomous mode, or a partial autonomous mode.

In one embodiment, autonomous driving vehicle 601 includes, but is not limited to, autonomous driving system (ADS) 610, vehicle control system 611, wireless communication system 612, user interface system 613, and sensor system 615. Autonomous driving vehicle 601 may further include certain common components included in ordinary vehicles, such as, an engine, wheels, steering wheel, transmission, etc., which may be controlled by vehicle control system 611 and/or ADS 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 7:
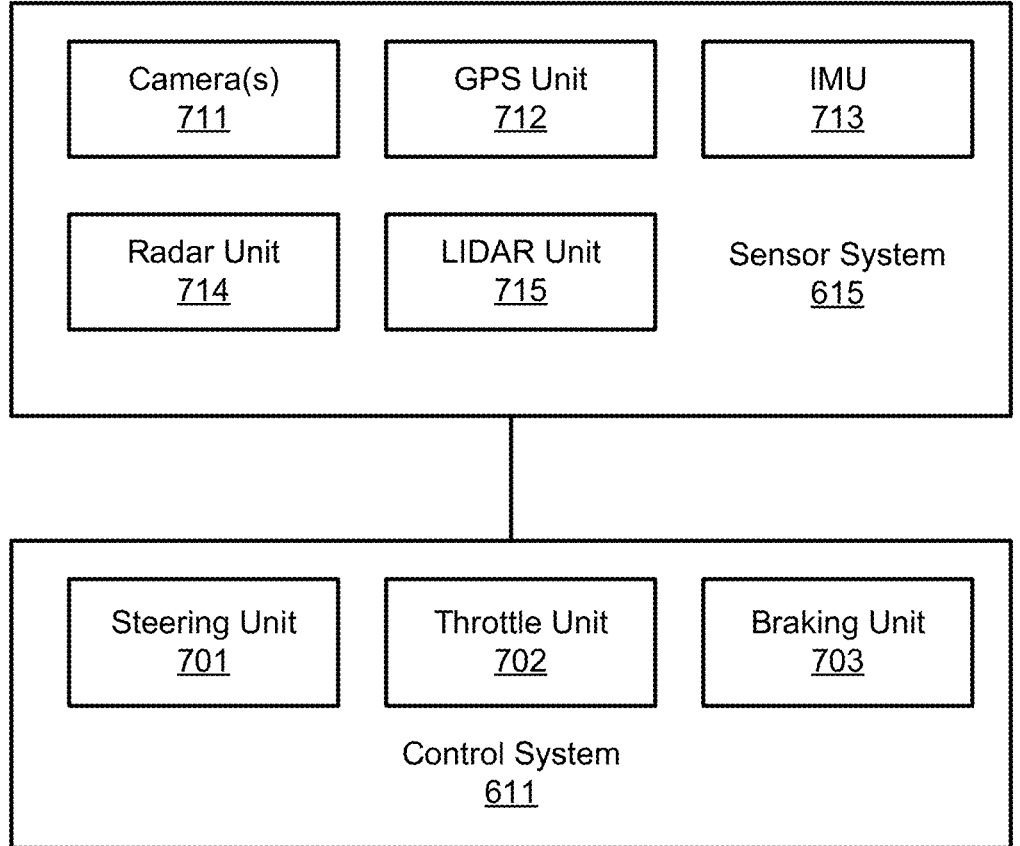
FIG. 7 is a block diagram illustrating an example of an embodiment of an autonomous driving vehicle.

Referring now to FIG. 7, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 7 may be implemented in hardware, software, or a combination thereof.

Referring back to FIG. 6, wireless communication system 612 is to allow communication between autonomous driving vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using Wi-Fi to communicate with another component or system. Wireless communication system 612 could communicate directly with a device (e.g., a mobile device of a passenger, a display device, a speaker within vehicle 601), for example, using an infrared link, Bluetooth, etc. User interface system 613 may be part of peripheral devices implemented within vehicle 601 including, for example, a keyboard, a touch screen display device, a microphone, and a speaker, etc.

Some or all of the functions of autonomous driving vehicle 601 may be controlled or managed by ADS 610, especially when operating in an autonomous driving mode. ADS 610 includes the necessary hardware (e.g., processor (s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, ADS 610 may be integrated with vehicle control system 611.

For example, a user as a passenger may specify a starting location and a destination of a trip, for example, via a user interface. ADS 610 obtains the trip related data. For example, ADS 610 may obtain location and route data from an MPOI server. The location server provides location services and the MPOI server provides map services and the POIs of certain locations. Alternatively, such location and MPOI information may be cached locally in a persistent storage device of ADS 610.

While autonomous driving vehicle 601 is moving along the route, ADS 610 may also obtain real-time traffic information from a traffic information system or server (TIS). Note that the servers may be operated by a third party entity. Alternatively, the functionalities of the servers may be integrated with ADS 610. Based on the real-time traffic information, MPOI information, and location information, as well as real-time local environment data detected or sensed by sensor system 615 (e.g., obstacles, objects, nearby vehicles), ADS 610 can plan an optimal route and drive vehicle 601, for example, via control system 611, according to the planned route to reach the specified destination safely and efficiently.

Figure 8:
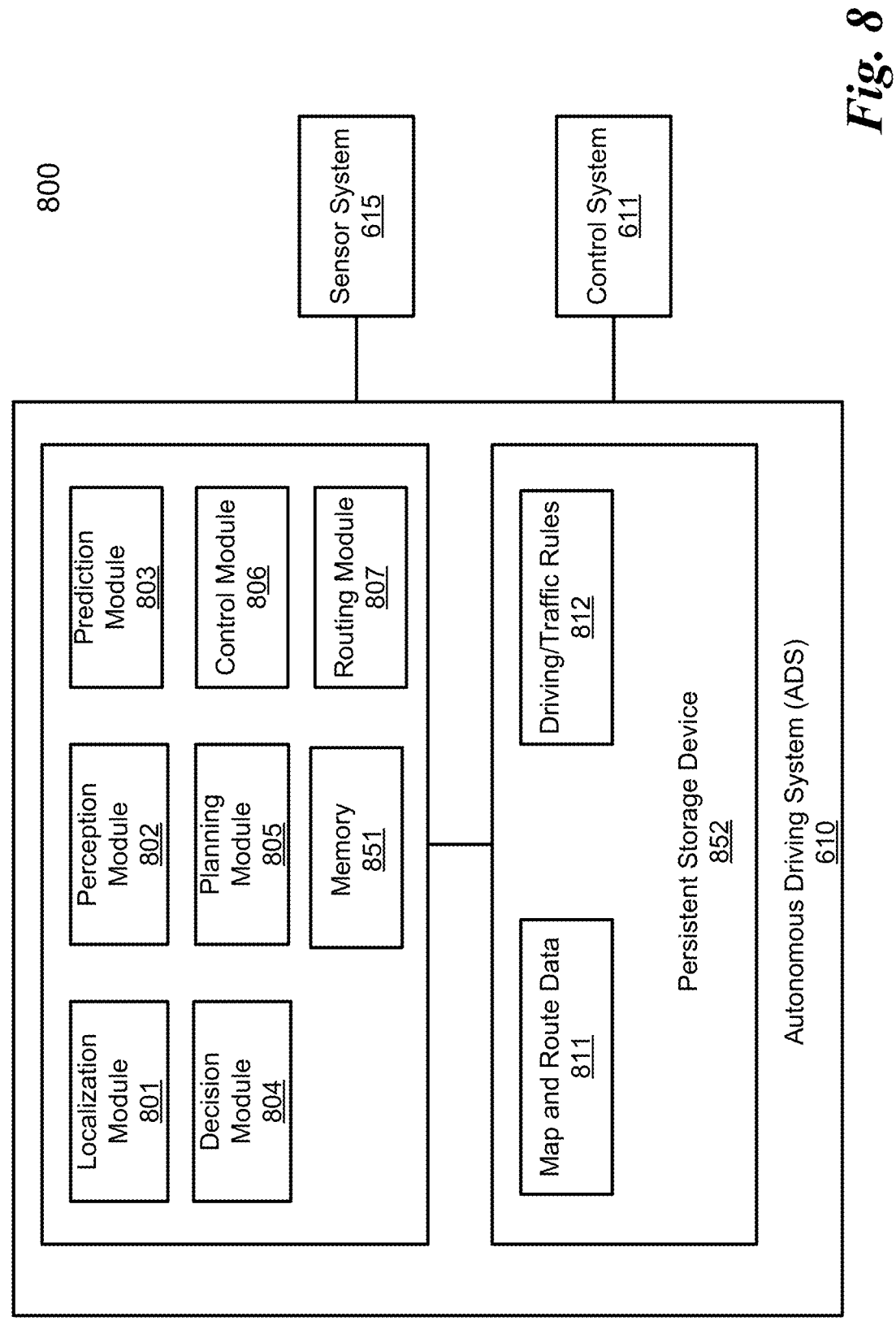
FIG. 8 is a block diagram illustrating an example of an embodiment of an autonomous driving system used with an autonomous driving vehicle.

FIG. 8 is a block diagram illustrating an example of an autonomous driving system used with an autonomous driving vehicle according to one embodiment. System 800 may be implemented as a part of autonomous driving vehicle 601 of FIG. 6 including, but is not limited to, ADS 610, control system 611, and sensor system 615. Referring to FIG. 8, ADS 610 includes, but is not limited to, localization module 801, perception module 802, prediction module 803, decision module 804, planning module 805, control module 806, and routing module 807.

Some or all of modules 801-807 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 7. Some of modules 801-807 may be integrated together as an integrated module.

Localization module 801 determines a current location of autonomous driving vehicle 601 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 601, such as map and route data 811, to obtain the trip related data. For example, localization module 801 may obtain location and route data from a location server and a map and POI (MPOI) server. A location server provides location services and an MPOI server provides map services and the POIs of certain locations, which may be cached as part of map and route data 811. While autonomous driving vehicle 601 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, roadway boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point. For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 601 would move in a next moving cycle (e.g., next route/ path segment). For example, the planning and control data may instruct vehicle 601 to move 10 meters at a speed of 30 mile per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

According to one embodiment, a system architecture of an autonomous driving system as described above includes, but it is not limited to, an application layer, a planning and control (PNC) layer, a perception layer, a device driver layer, a firmware layer, and a hardware layer. The application layer may include user interface or configuration application that interacts with users or passengers of an autonomous driving vehicle, such as, for example, functionalities associated with user interface system 613. The PNC layer may include functionalities of at least planning module 805 and control module 806. The perception layer may include functionalities of at least perception module 802. In one embodiment, there is an additional layer including the functionalities of prediction module 803 and/or decision module 804. Alternatively, such functionalities may be included in the PNC layer and/or the perception layer. The firmware layer may represent at least the functionality of sensor system 615, which may be implemented in a form of a field programmable gate array (FPGA). The hardware layer may represent the hardware of the autonomous driving vehicle such as control system 611. The application layer, PNC layer, and perception layer can communicate with the firmware layer and hardware layer via the device driver layer.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

Other embodiments are possible besides the ones described above. For instance, in other embodiments:

The ADV computer can be connected to VLAN while the ADV is plugged into a power outlet for charging or can be connected via high-speed wireless service like 5G or Wi-Fi to get connected to network for OTA programming or updating and for providing computing services.

Individual ADV computers can be connected directly to a network to serve as a micro data center, or multiple ADVs can be combined first as a computer cluster to provide service together to local users.

The ADVs can be owned by private users or by robo-taxi companies, as long as the owners allow cloud service providers to access the ADV computer and switch modes from autonomous driving mode to computing mode.

The above description of embodiments is not intended to be exhaustive or to limit the invention to the described forms. Specific embodiments of, and examples for, the invention are described herein for illustrative purposes, but various modifications are possible.

What is claimed is:

1. A data center comprising:
a plurality of computers;
a communication interface communicatively coupled to the plurality of computers and adapted to communicate, wirelessly or by wire, between at least one of the plurality of computers, a user device, and at least one autonomous driving vehicle (ADV) computer;
instructions stored in the plurality of computers that, when executed, cause one or more of the plurality of computers, via the communication interface, to:
receive a user computing request from the user device;
determine whether there is an available ADV computer to execute the user computing request;
if there is an available ADV computer to execute the user computing request:
reconfigure the available ADV computer from autonomous driving mode to computing mode, and
transmit the user computing request for execution by the ADV computer operating in computing mode; and
if there is no available ADV computer to execute the computing request, then execute the user computing request at the data center using one or more of the plurality of computers.

2. The data center of claim 1 wherein the instructions to transfer the user computing request to the reconfigured ADV computer includes instructions to:

transfer the requested operations, data, and a network address of the user device to the ADV computer operating in computing mode;

transfer any data stored in the data center and necessary for the requested operations to the ADV computer operating in computing mode.

3. The data center of claim 1 wherein the instructions stored in the plurality of computers include instructions for the data center to periodically receive a location and an availability status of the ADV computer.

4. The data center of claim 3 wherein the instructions to determine whether there is an available ADV computer to execute the user computing request include instructions to:

determine the location of the user device; and determine whether there is an ADV computer:

within a specified distance of the user device; or with which a communication path of sufficient bandwidth can be established with the user device.

5. The data center of claim 1 wherein the instructions stored in the plurality of computers include instructions to reconfigure the available ADV computer from computing mode to autonomous driving mode.

6. The data center of claim 1 wherein an ADV computer is available if the ADV in which the ADV computer is located is idle.

7. The data center of claim 6 wherein the ADV is idle when the ADV computer need not interact with the vehicle control system.

8. The data center of claim 1 wherein reconfiguring the ADV computer comprises reconfiguring the ADV computer using over-the-air (OTA) programming.

9. An autonomous driving vehicle (ADV) comprising:

an ADV computer communicatively coupled to a vehicle control system and a vehicle sensing system, the ADV computer including a communication interface that is adapted to communicate wirelessly with a data center and a user device external the ADV, wherein the ADV computer is adapted to run in an autonomous driving mode and in a computing mode;

instructions stored on the ADV computer that, when executed, cause the ADV computer to:

receive, via the communication interface, instructions to reconfigure the ADV computer from the autonomous driving mode to the computing mode, receive a user computing request from the data center, establish a direct communication path with a user device from which the user computing request originated, execute the user computing request while in computing mode, transmit the results of executing the user computing request to the user device via the communication path, and signal to the user device that the user computing request was completed.

10. The ADV of claim 9 wherein the instructions stored on the ADV computer further include instructions for the ADV computer to:

determine whether the ADV computer is available to be reconfigured from the autonomous driving mode to the computing mode; and if the ADV computer is available to execute the user computing request, then, via the communication interface:

transmit the ADV's location to the data center, and signal to the data center that the ADV computer is available to be reconfigured from the autonomous driving mode to the computing mode.

11. The ADV of claim 9 wherein the instructions stored on the ADV computer further include instructions for the ADV computer, when in computing mode, to:

receive a signal from the ADV or from the data center that the ADV computer is no longer available for computing mode; and receive, via the communication interface, instructions to reconfigure the ADV computer from the computing mode to the autonomous driving mode.

12. The ADV of claim 9 wherein the instructions stored on the ADV computer further include instructions for the ADV computer that, when in computing mode, allow the ADV computer to exchange data with the user device before, during, and after execution of the user data request.

13. The ADV of claim 9 wherein the user computing request includes a network address of the user device.

14. The ADV of claim 9 wherein the instructions stored in the ADV computer include instructions to regularly report to the data center a location and an availability status of the ADV computer.

15. The ADV of claim 9 wherein the ADV computer is available if the ADV in which the ADV computer is located is idle.

16. The ADV of claim 15 wherein the ADV is idle when the ADV computer need not interact with the vehicle control system.

* * * * *